United States Patent [19]

Palatov

[11] Patent Number: 5,510,691

[45] Date of Patent: Apr. 23, 1996

[54] MODULAR POWER SUPPLY AND MODULAR INTERCONNECT SYSTEM FOR PORTABLE ELECTRONIC EQUIPMENT

[75] Inventor: Dennis Palatov, Lake Forest, Calif.

[73] Assignee: Xtend Micro Products, Inc, Irvine, Calif.

[21] Appl. No.: 227,120

[22] Filed: Apr. 13, 1994

[51] Int. Cl.[6] .................................................. H01M 10/46
[52] U.S. Cl. ............................................................ 320/2
[58] Field of Search .................................. 320/2, 6, 8, 9, 320/10, 15

[56] References Cited

U.S. PATENT DOCUMENTS

| | | | |
|---|---|---|---|
| 3,896,364 | 7/1975 | Reister | 320/2 |
| 4,109,193 | 8/1978 | Schultheis | 320/2 |
| 4,829,224 | 5/1989 | Gandelman et al. | 320/2 |
| 5,200,685 | 4/1993 | Sakamoto | 320/2 |

*Primary Examiner*—Peter S. Wong
*Assistant Examiner*—Edward Tso
*Attorney, Agent, or Firm*—Curtis L. Harrington

[57] ABSTRACT

The modular battery recharger and power distribution system for notebook and lap top computers of the present invention encompasses both an apparatus and method enabling the use of as many standardized structures as is possible to construct a wide variety of power configurations. First, all of the structures of the present invention are adapted to accept a common charging voltage at advantageous points, which may in some instances be 12 volts. The components of the present invention interconnect and disconnect to enable the user to take advantage of alternate power sources. More importantly, the user can use the charger system to re-charge power packs separately while using the original external power supply to operate the computer. In other instances, the user can use a smaller "mini brick" unit to obtain power from a 12 volt DC source. A 12 volt wall unit can be used in conjunction with the "mini-brick" to power either the computer or stand-alone charger from a 115 volt AC wall unit.

4 Claims, 2 Drawing Sheets

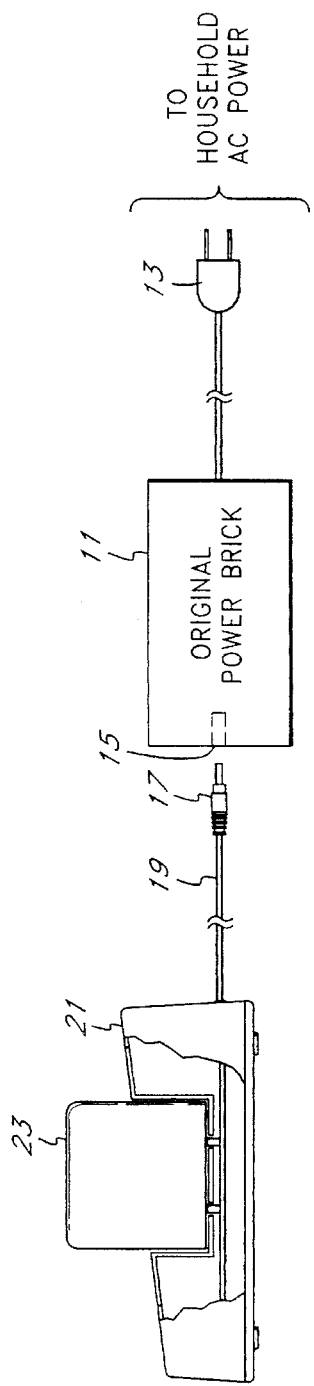
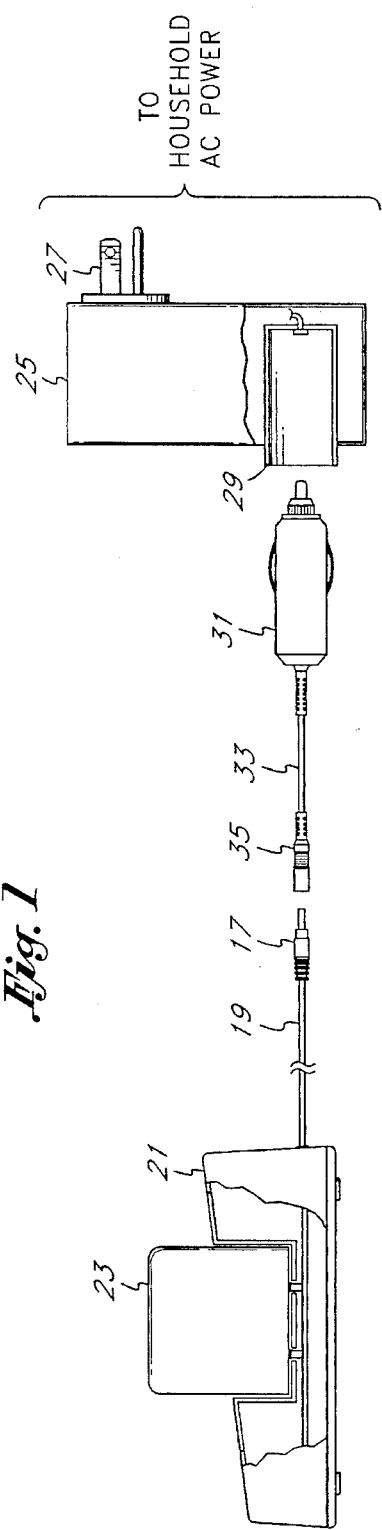
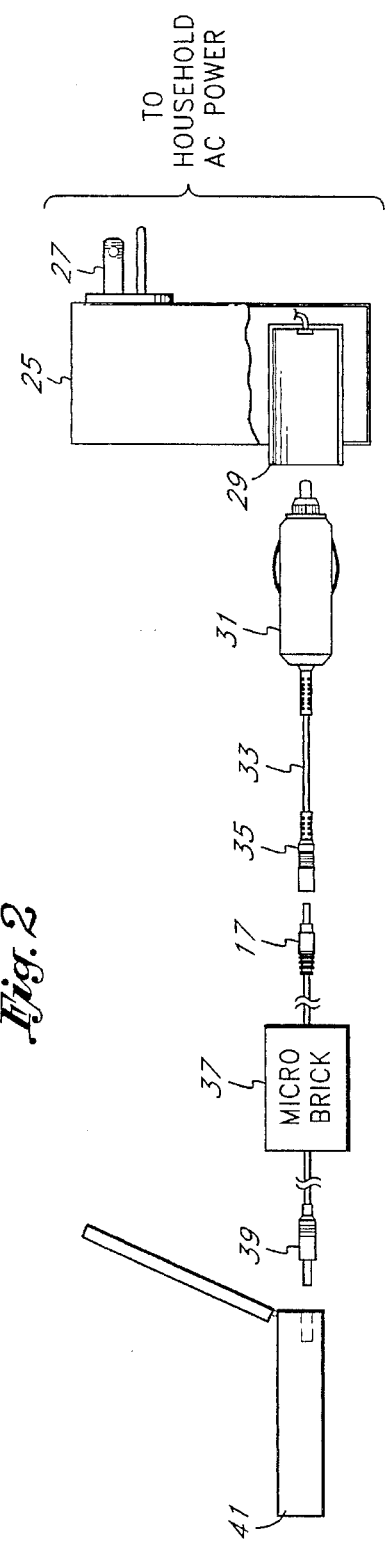

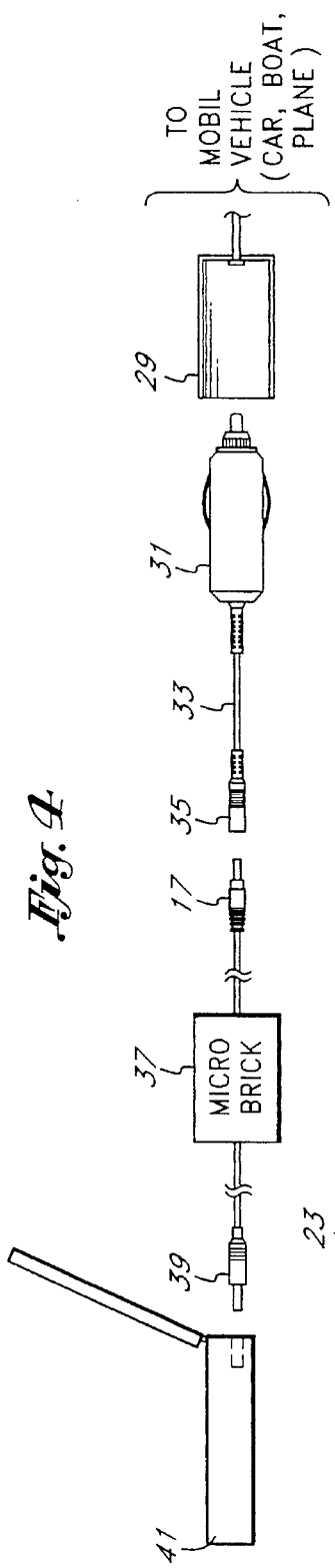
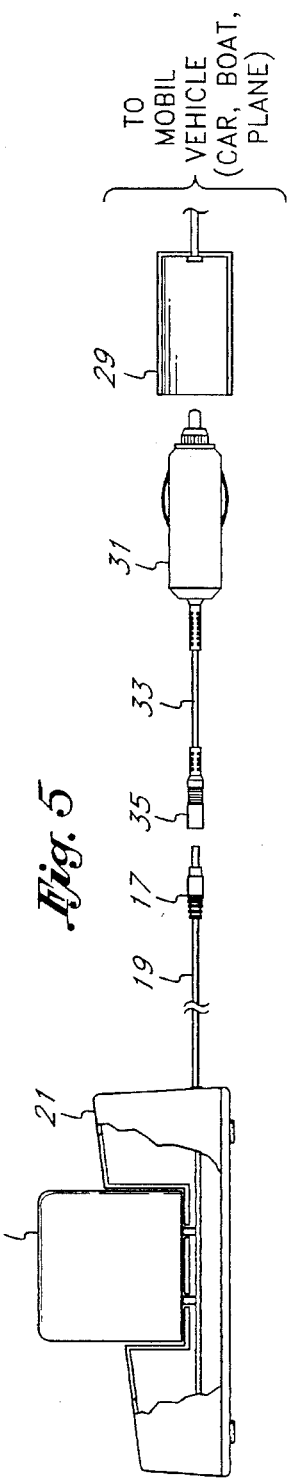
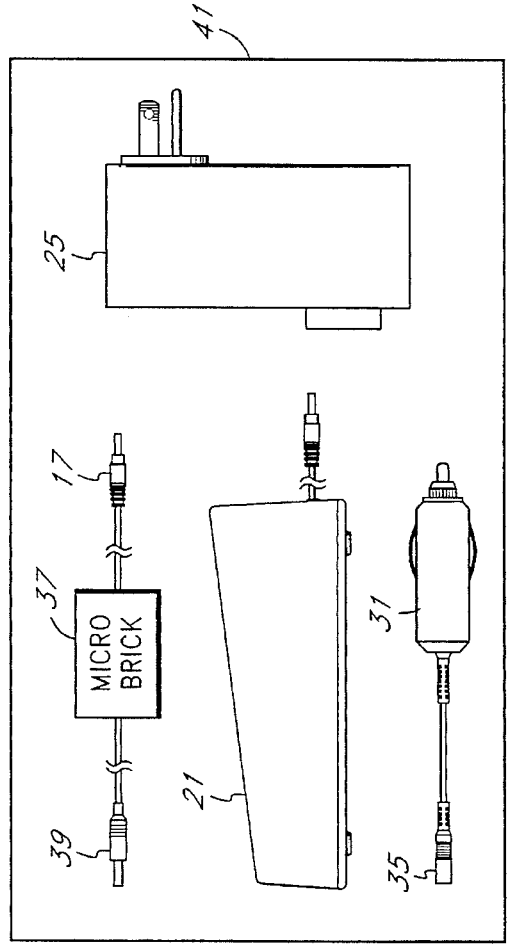

MODULAR POWER SUPPLY AND MODULAR INTERCONNECT SYSTEM FOR PORTABLE ELECTRONIC EQUIPMENT

FIELD OF THE INVENTION

The present invention relates to the field of electronic battery charging devices and systems. More specifically, the present invention relates to a system for efficient interchanging of power transfer components and electronics to maximize the user's ability to both utilize the portable electronic equipment, and specifically notebook and lap top computers, in a variety of circumstances, as well as to facilitate the re-charge of power packs to insure that a ready and convenient supply of use and recharge power is made available.

BACKGROUND OF THE INVENTION

Electronic appliances having rechargeable batteries are becoming more commonplace, particularly with respect to personal computing and communications devices, especially lap top and notebook size personal computers. These devices, as well as other devices have evolved a multiplicity of different ways in which the batteries may be charged. In most instances, and typically along with components which are supplied with the notebook or laptop computer at the time of purchase, a recharger power source is plugged into the personal computer during the time which the notebook computer contains the rechargeable batteries. The power from the recharger power source, also known as the original external power supply, is routed to the batteries as they reside in the computer. Such a scheme may be efficient with respect to the purpose of enabling operation of the personal computer even when the battery is depleted, but it is not conducive to freeing the personal computer from the charging process, nor does it help the user to keep a supply of freshly charged batteries without the problems associated with re-loading the personal computer with each successive set of batteries in order to charge those sets of batteries. Further, the computer batteries may not re-charge efficiently while the computer is being used with power from the re-charging "brick."

A further complication in an attempt to have a more efficient system is due to differing voltage requirements for different personal computers. Each personal computer system sold will usually have a different size, shape, and type of battery, having different voltage and current characteristics. Consequently, each original external power supply will have the capability of converting the 115 volt house current to a different level of direct current voltage before supplying that voltage to the notebook computer for the purpose of either running the computer, charging the computer's batteries, or both, if possible.

Further, each original external power supply is designed with limitations on the amount of power supplied, and other characteristics which may be particular to the computer's need for a "clean" or non rippling power source. In addition, the original external power supply has a mass density usually as high or higher than other components of the system; it is very heavy. When the user is traveling, it adds significant weight to luggage. In addition, when travelling, the user may not always be near a source of alternating current power. If direct current power is available, an inverter is required to convert the direct current to alternating current, which the original external power supply then converts to direct current to be utilized by the laptop computer.

Other schemes, not necessarily in the notebook computer area, have involved the placement of charging electronics directly into a battery pack. Examples of this technique include the use of flashlights plugged directly into the wall. This has two disadvantages. First, when each battery has such electronics, even if only an additional electrical connector to accommodate a power plug, the cost of each battery pack increases. Secondly, all battery packs have a limited life and will be disposed of. The presence of additional structures on the disposed of batteries equates to additional waste. Further, the imposition of additional electronics equates to an increase in space requirements. One of the competitive aspects of small personal computers is their reduced size, and this goal would be defeated if the presence of additional electronics were imposed on each battery pack.

The possibility of a separate charger for personal computer batteries, as well as other personal appliance batteries has been considered and adopted, especially in group settings where a large number of batteries need to be available and re-charged on a large scale. The use of a separate recharging stand, the so-called "drop charger," has previously carried with it many of the disadvantages associated with charging the batteries with the appliance. Each drop charger is tied to the shape and electrical characteristics of the battery to be charged, and each drop charger has its own AC to DC power conversion circuitry. Such drop chargers are typically just as heavy as the original external power supply, and also typically cost as much or more.

Some direct current power supplies which operate with standard output voltages, such as 12 volts may be obtained inexpensively due to their large numbers of manufacture. Further, a source of 12 volt power is available in a variety of other circumstances, such as automobiles, boats, and from other, stand alone power supplies. An example of the latter might be an amateur radio station where a 12 volt supply is usually readily available. In such cases, the 12 volt power supply may actually provide a cleaner, less distorted supply of power than could be made available with the original external power supply.

The electrical characteristics of a battery pack are governed by the shape of the chemical cell, and the voltage and current load demanded by the appliance. The shape of the chemical cell may also determine the charging rate, and whether a charging cycle can be employed. Such charging cycles may incorporate typically a fast, higher voltage and current charging process for a limited time, followed by a slower charge of open-ended duration. In turn, the shape and size of the battery pack is determined by the physical restraints upon the personal computer.

Under currently available configurations, the circuitry which determines the charging characteristics are incorporated with the original external power supply. The additional weight of this circuitry is required to be transported with the computer, even when no charging is desired, as when it is desired to power the computer directly from the non-portable power source.

Further, all of the above characteristics makes it difficult for a manufacturer to even attempt to build and supply a single drop charger, or charging system for a particular battery pack. A manufacturer would have to supply a custom drop charger accommodated for the original external power supply, as well as other specialized components for each portion of the battery pack charging system. Such custom designs severely limit the entry into such a market, and raise the cost to the consumer for any such products supplied. Other market limitations involve the risk of investment in inventory. For a manufacturer of drop chargers and power supplies, the cost of the inventory of customized parts, as well as the probability of obsolescence would have to be included in the price computation. The probability of obsolescence factor will always work to the disadvantage of an outside manufacturer (one who does not manufacture the appliance to which the power pack is to be connected). An inside manufacturer can control the obsolescence, and in some cases deliberately cause the obsolescence to defeat the ability of the outside manufacturer to compete. This factor, in combination with the natural marketing advantage obtainable on products whose source is the same source as the appliance (inside manufacturer), works to the disadvantage of consumers and to the denigration of competition.

What is therefore needed is an array of power transfer components which can accomplish several goals. The power transfer components should be lightweight and interconnectable. The power transfer components should be re-configurable to quickly take advantage of the power which is available. The power transfer components should be amenable to re-configuration to meet the particular demands of the notebook computer user. The system should also maximize the power availability to the user both in terms of maximizing his availability to power the computer from a non-portable source of power, as well as the ability to insure that an ample source of portable power will be available.

The components should be designed to avoid specialization to enable electrical characteristic redundancy. What is needed is a charging and power supply system which has the minimum number of parts specific to a single model of power pack, and which facilitates modularization minimizing value of the components which have the specific characteristics.

What is also needed is a recharger and power distribution system which allows a manufacturer to maximize the use of parts and system components which are common to all drop charger units manufactured. A structure enabling such use of common components and parts would help to eliminate the risk associated with multiple sets of custom parts.

SUMMARY OF THE INVENTION

The modular power supply and modular interconnect system for portable electronic equipment, and specifically notebook and lap top computers, of the present invention encompasses both an apparatus and method enabling the use of as many standardized structures as is possible to construct a wide variety of power configurations.

First, all of the structures of the present invention are adapted to accept a common charging voltage at advantageous points, which may in some instances be 12 volts. The components of the present invention interconnect and disconnect to enable the user to take advantage of alternate power sources such as vehicle electrical systems. More importantly, the user can use the charger system to re-charge power packs separately while using the original external power supply to operate the computer. In other instances, the user can use a smaller "mini brick" unit to obtain power from a 12 volt DC source. A 12 volt wall unit can be used in conjunction with the "mini-brick" to power either the computer or stand-alone charger from a 115 volt AC wall unit.

BRIEF DESCRIPTION OF THE DRAWINGS

The invention, its configuration, construction, and operation will be best further described in the following detailed description, taken in conjunction with the accompanying drawings in which:

FIG. 1 is a schematic view showing an original external power supply powered from a domestic alternating current source, plugged into a drop charger of the present invention;

FIG. 2 is a schematic view showing a direct current source to be plugged into a domestic alternating current source, a vehicle lighter plug connected to the direct current source, and connected to the drop charger of the present invention;

FIG. 3 is a schematic view showing a direct current source to be plugged into a domestic alternating current source, a vehicle lighter plug connected to the direct current source, and connected to a micro brick DC-DC adapter, and thence to a laptop computer;

FIG. 4 is a schematic view showing a direct current source, such as would be available in a car or boat, a vehicle lighter plug connected to the direct current source, and connected to a micro brick DC-DC adapter, and thence to a laptop computer;

FIG. 5 is a schematic view showing a direct current source, such as would be available in a car or boat, a vehicle lighter plug connected to the direct current source, and thence to a laptop computer; and FIG. 6 illustrates the components of the system disclosed herein assembled into a kit.

DETAILED DESCRIPTION OF THE PREFERRED EMBODIMENT

The description and operation of the invention will be best described with reference to FIG. 1. FIG. 1 is a schematic view of a first configuration possible with the present invention. An original external power supply 11 usually comes with the laptop or notebook computer purchased from the computer manufacturer. This original external power supply 11 will typically have a standard house plug 13 for accepting a 115 volt alternating current source of power.

The original external power supply 11 which is provided with a personal computer serves to provide a source of direct current power, which is usually provided at or below the 12 volt level into the computer. The power may be used to run the personal computer or to re-charge the batteries upon which the computer can operate.

As is shown in the configuration of FIG. 1, the original external power supply 11 has a jack 15, or other connector, which may be used to connect to the personal computer. Such connection may be via a cable extending from the original external power supply 11, or by another cord connecting the original external power supply 11 to the personal computer.

The present invention's purpose is to extend the utility with which a personal computer and the use of its battery pack may be derived. As such, one of the first components is shown to the left of the original external power supply 11. A plug 17 is compatible with the jack 15, or other connecting appliance of the original external power supply 11. Plug 17 connects to a cord 19 extending from a drop charger 21.

Charger 21 may be of a type containing charge regulation circuitry, and which is capable of operating on a wide variety of input voltages, such as from 6 to about 30 volts DC. As can be seen, charger 21 contains and supports a battery power pack 23 whose shape and size will be dictated by the shape and size of the personal computer into which it will fit. The original external power supply 11 is bulky and heavy, and the configuration of FIG. 1 illustrates how it may be used to provide, along with the drop charger 21, a home base charging capability. Typically, the drop charger 21 may have the capability of charging at least one, and possibly two battery packs 23. Such a configuration enables a ready supply of charged battery packs 23, while freeing a personal laptop computer to be used elsewhere.

Referring to FIG. 2, additional components are disclosed. A wall power supply 25 has a plug portion 27 and a female direct current power socket 29. The socket 29 accommodates a cigarette lighter-type plug, to eliminate the necessity of having a different type plug for the wall power supply 25 than would be used in a socket located in a vehicle, as will be shown. Opposite the socket 29, a male socket-type plug 31 is shown connected to a short length of cable 33 and to a female interfitting connector 35. Interfitting connector 35 may be of about the same configuration as the jack 15 of the original external power supply 11. In some instances, the connectors 35 and 17 may be designed to be incompatible with connectors other than each other which are supplied as components for practicing the power distribution techniques of the present invention.

In the configuration of FIG. 2, household power may drive the direct current source power supply 25, which in turn drives the drop charger 21 to charge battery packs 23.

Referring to FIG. 3, the power supply 25, is used to drive a micro-brick DC-DC converter 37. A connector 39 is connected to the converter 37, and designed to connect into a personal computer 41. This converter 37 converts the 12 volt direct current produced by the direct current source power supply 25, to a lower voltage, which is the voltage at which the personal computer 41 operates. The advantages of the converter 37 are several. First, the configuration of FIG. 3 contemplates that power supply 25 and the connector 35 and plug 31 may be produced as standard items to serve all personal computer needs. Secondly, the micro-brick is typically about eight cubic inches or less in size and weighs a fraction of that of the original external power supply 11. This weight savings makes a big difference for users whose temporary use might be so extended as to require a source of non-battery power. Thirdly, the configuration of FIG. 1 may be utilized concurrently with the configuration of FIG. 3, in that other battery packs 23 may be independently charging while the converter 37 and power supply 25 is used to provide the primary power to the personal computer 21.

Referring to FIG. 4, a configuration similar to that shown in FIG. 3 illustrates the use of power directly from a 12 volt source, such as a car or boat, rather than with the use of the power supply 25. The supply of 12 volt power is applied directly to the socket 29.

Referring to FIG. 5, a configuration is shown in which a source of 12 volt power is supplied to the socket 29, which is in turn supplied through the plug 31, cable 33, and connector 35 to the charger 21. In this configuration, charging power may be derived from a 12 volt power source, such as a car, boat, or other source of 12 volt power. A battery pack 23 could be charged from an automobile to insure a ready supply of charged battery packs 23 for the on-the-go user.

The components of the system disclosed herein are contemplated to be sold as a kit, including in the kit the direct current power supply 25, the connection set made up of the plug 31, cable 33 and connector 35, the charger 21, and the micro-brick converter 37 along with its connectors 17 and 39. The kit, as packaged is shown in FIG. 6 and is collectively referred to as kit 41. Kit 41 would permit all of the configurations shown in FIGS. 1–5. Further, if the connectors leading into the charger 21 and converter 37 are of the correct size, a conventional twelve volt power supply could be used in addition to the direct current power supply 25, especially where the original external power supply 11 was not working, etc.

While the present invention has been described in terms of a power interconnect system, one skilled in the art will realize that the structure and techniques of the present invention can be applied to many appliances. The present invention may be applied in any situation where a battery power pack recharger, power supplies, and interconnects need to be designed to accommodate many configurations.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A modular power supply system comprising:
   a personal computer having a power input for accepting power at a pre-specified voltage;
   a DC-DC converter having a 12 volt nominal input and an output at said pre-specified voltage and having a first connector associated with said output connectable to said personal computer and a second connector associated with said 12 volt nominal input;
   an interconnect cord set further comprising:
   a cigarette lighter-type plug;
   a third connector connected to said cigarette lighter-type plug and connectable to said second connector of said DC-DC converter.

2. The modular power supply system recited in claim 1, and further comprising a power converter with circuitry and interconnect means and including a fourth connector connectable to said second connector, to convert household alternating current power from a standard wall socket at nominal 115 volts into direct current acceptable to said DC-DC converter through said fourth connector.

3. The modular power supply system recited in claim 1 wherein said first connector is incompatible for connection with said third connector.

4. A kit for enabling the charging supply system of a battery powered personal computer comprising:
   a battery charger having a power input for accepting power at a voltage of from about 6 to about 30 volts;
   a direct current-direct current converter having a 12 volt nominal input and an output at a pre-specified voltage;
   an interconnect cord set having a first connector at one end and a second connector at another end, said second connector connectable with said battery charger and with said input of said direct current-direct current converter; and
   a direct current power supply for powering one of said battery charger and said direct current-direct current converter.

\* \* \* \* \*